Patented Feb. 24, 1931

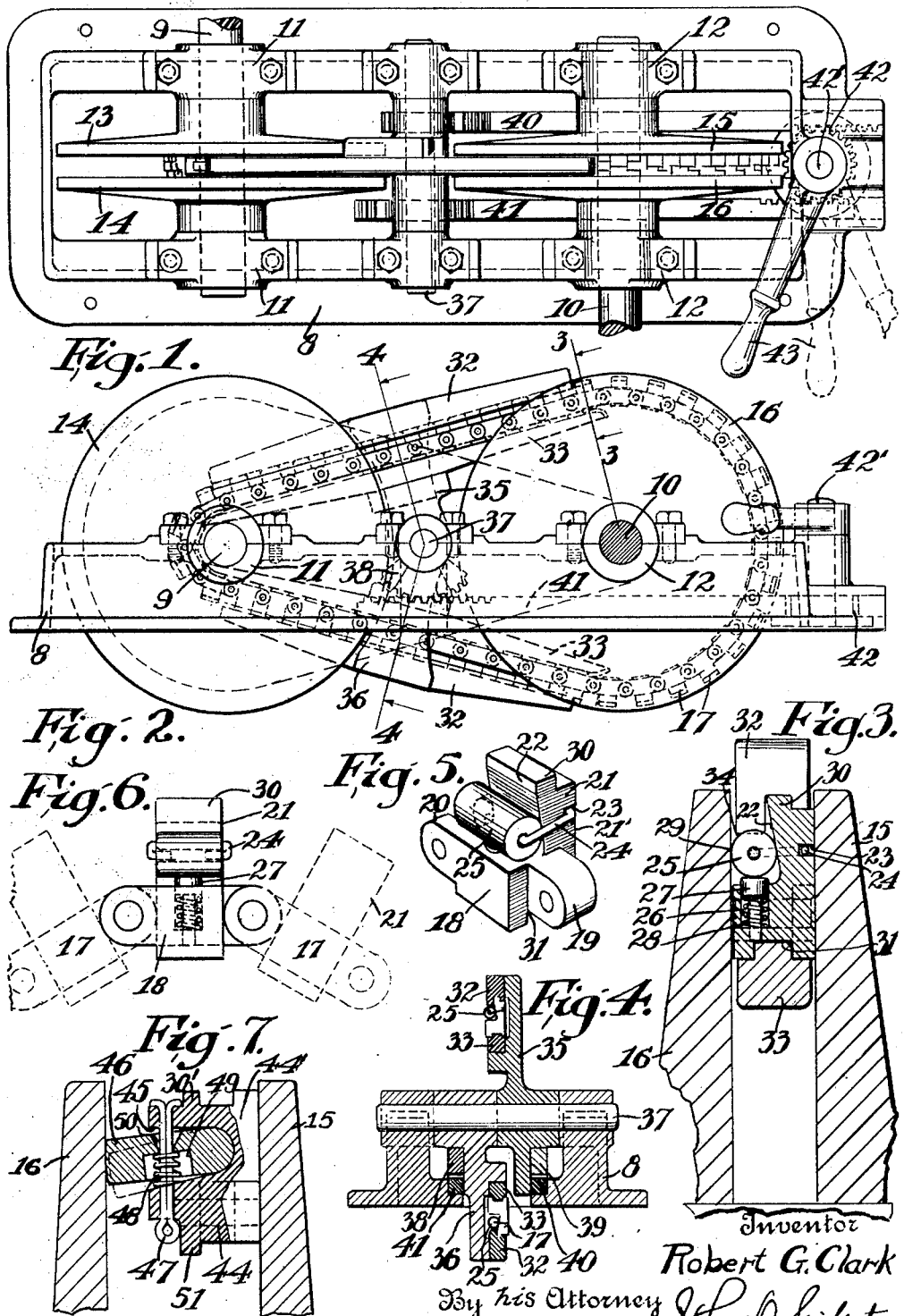

1,793,998

UNITED STATES PATENT OFFICE

ROBERT G. CLARK, OF BROOKLYN, NEW YORK

POWER-TRANSMISSION MECHANISM

Application filed May 28, 1926. Serial No. 112,247.

This invention relates to variable speed power transmission mechanism whereby to change the ratio of speed of rotation between a driving element and a driven element, particularly adapted for use in machine tools, although it may be adapted for other purposes, and wherein changes in speed of one of the elements relative to the other may be made without bringing either of said elements to rest or disconnecting the driving element from its source of power, and it is the object of the invention to provide power transmission mechanism of this character which is simple and cheap in structure and efficient in use.

In carrying out the invention there is provided a driving shaft and a driven shaft, each shaft being arranged with a pair of opposed friction disks in alined relation to each other, the shafts being coupled together by a chain gear engaging between the opposed disks, the links of which chain are arranged as grippers to impinge against the opposed disks by a radial pull on the chain gear to transmit the movement of the driving disks to the driven disks. Adjustable means are provided to guide and change the direction of travel of the chain gear and the position thereof radially of the disks to vary the ratio of revolution of one shaft relative to the other shaft without disconnecting the driving means from the driven means or retarding the revolution of the driving means as by disconnecting said means from the source of power, as by a clutch.

In the drawing accompanying and forming a part of this specification, Figure 1 is a plan view showing the embodiment of my improved power transmission mechanism.

Figure 2 is a side elevation looking at the bottom of Figure 1.

Figure 3 is a cross sectional view, on an enlarged scale, taken on the line 3—3 of Figure 2 looking in the direction of the arrows and showing a part of a pair of disks and the connecting means therefor.

Figure 4 is a cross sectional view, on an enlarged scale, taken on the line 4—4 of Figure 2 looking in the direction of the arrows.

Figure 5 is a perspective view of a link of the gear chain.

Figure 6 is a side elevation of the link shown in Figure 5 and showing the relation thereof to adjacent links shown in dotted lines; and Figure 7 is an end elevation, partly in section, showing a modified form of chain link.

In the embodiment of the invention shown in the drawing there is provided an open frame 8 carrying two parallel shafts 9 and 10 rotatably mounted in bearings 11 and 12. Either of the shafts may be connected to a source of power and for the purpose of description the shaft 10 will be considered as being the driving shaft, and the other shaft 9 the driven shaft. On the shaft 9 there is fixed a pair of disks 13, 14 in opposed and spaced relation. Disks 15, 16 are mounted on the shaft 10 in the same manner.

To transmit the rotation of the driving shaft and disks 15, 16 to the driven shaft through disks 13, 14, connecting means are provided in the form of a chain gear, the links 17 of which, as shown in Figures 3, 4 and 5, comprise a body portion 18 in the form of a block with an integral perforated central ear 19 extending from one end with the opposite end thereof bifurcated, as at 20, with the legs of the bifurcation perforated. A projection 21 extends outward from and with one face 21' in the plane of the link body, the opposite face 22 being cut away and diverging outward from the body of the link. The outer face 21' is arranged with a longitudinal recess 23 for engagement of the inwardly bent ends of a U-shaped member 24 formed of wire and having a gripper or clutch member in the form of a roller 25 mounted on the connecting portion thereof. This roller carrying member 24 is so arranged that the roller may have movement laterally of the projection and outwardly from the link body by the engagement thereof with the diverging face 22 of the link projection. A plunger 27 having two diameters is slidably mounted in a perforation 26 in the link body below the roller, the plunger being urged outward into engagement with the roller by a spring 28, this outward movement being limited by the roller carrier 24 and the inclined face 22 of the link projection 21, and when engaged between a pair of the friction surfaces this force of the spring wedging the roller between the incline face 22 of the link projection 21 and the adjacent friction disk, will impinge the roller against the surface of the disk, as at 29 in Figure 3, and impinge the opposite surface of the link body and projection against the surface of the opposite disk. The outer corner portion of the link projection 21 is cut away arranging the same with a longitudinally extending rib 30, and the bottom of the body of the link has a central longitudinal channel 31 for a purpose to be hereinafter described. The links are connected by interlocking the central ear 19 of one link between the legs of the bifurcation 20 of an adjacent link pivotally connected by a pin or riveted as is usual.

By this arrangement the links are arranged as a pair of laterally expansible and contractible gripping or clutch jaws. It will be obvious that the roller 29 will be urged outward and laterally to such an extent when passing through the spaces or gaps between the two pairs of disks that they will not engage between the opposed faces of the disks, and for this purpose means are provided to contract the roller to move it against the action of the plunger 27 and guide the links between the respective disks. This guiding means also serves to position the chain radially relative to the opposed surfaces of the two pairs of disks and comprises a pair of arms 35, 36 loosely mounted on and extending oppositely from a shaft 37 fixed at opposite ends in bearings on the frame 8 intermediate the shaft bearings 11, 12. Each arm has a pair of spaced parallel bars or rails 32, 33 fixed thereto forming a guideway for the links therebetween and are of a length so that the terminus thereof will be substantially at the bite of the grippers of the link chains with the friction disks. The bars 33 are arranged with a rib for engagement with the central channel 31 of the links. The bars 32 are shorter than the bars 33 and arranged in the inner face with a channel for engagement of the rib 30 of the link projections. One marginal wall portion of said channel is of greater length than the other wall portion and is adapted to engage the roller 25, as shown at 34 in Figures 3 and 4, to urge the roller in a direction against the tension of the plunger 27 and in position where it will be out of contact with the surface of the disks 14 and 16 to permit of the ready passage of the chain links between the disks. The guide rails 32, 33 are so arranged that when the links ride off from the same the rollers are freed to be urged outward by the spring plungers 27 and thereby cause said rollers and the body of the links to frictionally impinge against the faces of the opposed disks, and the radial inward pull on the chain links due to this frictional contact causing said rollers and link bodies to firmly grip the surface of the disks transmitting the movement of one pair of disks to the chain and the movement of the chain to the other pair of disks. Each of the guide bar carrying arms is arranged with a toothed or geared sector 38, 39 concentric with the pivotal support of the arms for engagement with rack teeth on bars 40, 41 slidably mounted in the frame 8. Reciprocable movement is imparted to the rack bars to rotate the gear sectors and thereby change the position of the guide bars carried by the arms by a pinion 42 fixed to a stud shaft 42' mounted in one end of the frame 8 to have rotative movement on a vertical axis and actuated by a hand lever 43 fixed thereto. When the gear 42 is rotated the rack bars are moved in opposite directions and the gear sectors 38, 39 are rotated in opposite directions transmitting proportional rocking movement to the arms 35, 36, whereby one end of the chain guides will be moved toward each other while the opposite ends will be moved a proportional distance away from each other. When it is desired to change the ratio of revolution of the shafts, for instance, to reduce the speed of shaft 10 relative to the speed of shaft 9 the guide bars 32, 33 are actuated so that the ends thereof engage between the disks 13, 14, and converge toward the shaft 9, while the opposite ends are adjusted to diverge from each other as shown in Figure 2. When the ratio is desired to be equal the bars are adjusted to extend in parallel relation.

A modification of the chain links is shown in Figure 7, and comprises a body portion 44 having a recess 45 in the side of a projection 44' extending outwardly from the link body, with the bottom wall of said recess inclining outward toward the pivotal support of the link for engagement of a gripping member or jaw in the form of a wedge 46. This wedge is mounted in the recess 45 by a cotter pin 47 to have movement in a direction radial of the disks and urged in an outward direction for impingement against the surface of one disk and the link projection against the surface of the opposite disk by a spring 48 coiled about the pin 47 and confined between the bottom of a seat 49 in the wedge and the inclined surface of the recess, this movement of the wedge being facilitated by inclining the wall of a perforation 50 through which the pin 47 extends. The link projection 44' is arranged with a longitudinally extending rib 30' for engagement in the longitudinal recess of the guide bar 32, one wall of which recess is elongated as stated to engage the wedge 46 to move it to the dotted line position shown in Figure 7 against the tension of the spring 48, similar to the movement of the roller 29 against the action of the plunger 27, to facilitate the guiding of the chain links between the friction disks. The rail or member 33 of the guiding means instead of being arranged with the longitudinal rib for engagement in a recess in the link body as shown in Figures 3, 4 and 5, is arranged with the longitudinal recess for the engagement of a rib 51 extending longitudinally of the link body opposite to the rib 30'. When the links leave the guiding means at which time the links are in engagement between a pair of disks the springs 48 force the wedges into impingement with the surface of one disk and the link body against the opposed disk surface to transmit the movement of the chain imparted thereto by one pair of disks to the other pair of disks.

While I have illustrated one embodiment of my power transmission mechanism, it will be obvious that various modifications may be made in construction and arrangement of parts, and that portions of the invention may be used without others, without departing from the scope of the invention.

By the arrangement described as the chain links are engaged between the disks with the spring influenced plunger 27 exerting a force on the roller 25 in a direction radially outward of the disks, or the spring 48 exerting such a force on the wedge 46 in the Figure 7 construction, thereby wedging the chain links between the disks, the force of this wedging action of the chain links is further increased by the lineal stress upon the chain, and this same stress on the chain as the leading ends of the links approach the entrance end of the guide rails will tend to release the links from the disks and thus facilitate the directing of the chain links between the guide rails.

Having thus described my invention, I claim:

1. In power transmission means, two pairs of opposed and fixed disks arranged in alined relation, means movable between and to engage the opposed disks to transmit the movement of one pair of disks to the other disks, and adjustable means for carrying the connecting means and guiding the same to variable positions radially between the disks to vary the speed of revolution of one pair of disks relative to the speed of the other pair of disks.

2. In power transmission means, two pairs of opposed and fixed friction disks arranged in alined relation, a chain gear for engagement between the disks, the links of which chain are arranged as clutch members adapted to be impinged upon the opposed friction disks by a force thereon radially inward of the disks, and means to carry said chain gear and guide the same to predetermined position radially of the friction disks.

3. In power transmission mechanism, two pairs of opposed friction disks arranged in alined relation, a chain, grippers carried by each link of the chain for impinging against the friction face of the opposed disks and transmitting rotative movement of one pair of disks to the other disks, guiding means adjustably mounted in opposed relation and arranged for engagement with opposed stretches of the chain, and means to adjust the guiding means for changing the ratio of revolution of the disks.

4. In power transmission mechanism, two pairs of opposed friction disks arranged in alined relation and to rotate in unison, a chain gear arranged with links having spring actuated gripping jaws for frictional contact with the opposed surfaces of the disks to transmit the rotative movement of one pair of disks to the other disks, pivotally mounted guide bars arranged in opposed relation for engagement with opposite stretches of the chain and guiding the chain links to disk engaging position and having gear teeth arranged concentric of the pivotal supports, racks for engagement with the gear teeth of the guide bars to adjust the same to change the ratio of rotation between the disks, and means to impart reciprocatory motion to the racks for the purpose specified.

5. In variable speed power transmission mechanism, the combination of a driving shaft, a pair of friction disks fixed in opposed and spaced relation on said shaft, a driven shaft arranged parallel to the driving shaft, a pair of friction disks fixed in opposed and spaced relation on said shaft and in alined relation with the first pair of disks on the driving shaft, flexible connecting means arranged for engagement between the opposed disks and having frictional engagement therewith for transmitting the motion of the driving disks to the driven disks, and means for carrying said connecting means and to guide and variably position the connecting means radially between the disks for the purpose specified.

6. Variable speed power transmission mechanism as claimed in claim 1, wherein the connecting means for transmitting the motion of the driving disks to the driven disks comprises a chain embodying pivotally connected links arranged as grippers to frictionally impinge against the opposed disks.

7. In power transmission mechanism, two pairs of rotatable friction surfaces fixed in opposed and spaced relation, a chain gear to travel between said surfaces, each link of said chain gear being arranged as a contractile and expansible clutch member normally urged to expanded position to impinge against the opposed surfaces of the friction surfaces to transmit the motion of one pair of said friction surfaces through the chain gear to the other pair of friction surfaces, and means engaged by opposite stretches of said chain gear to carry the same and adapted to contract the clutch members to guide the chain gear between the opposed friction surfaces and releasing the same when between the friction surfaces to permit the same to expand and frictionally engage said surfaces.

8. In power transmission mechanism, two pairs of opposed and spaced rotatable friction surfaces, a chain gear to travel between said surfaces, each link of said chain gear being arranged as a pair of laterally expansible grippers to impinge against the opposed friction surfaces to transmit the motion of one pair of said friction surfaces to the other pair of friction surfaces, and means supported between the pairs of friction surfaces to guide the chain gear and adjust the links thereof radially of the friction surfaces to vary the effective driving radii of the chain gear whereby the variation in the speed of movement of one pair of said friction surfaces to the other pair is accomplished.

9. In power transmission mechanism, two pairs of opposed and spaced friction surfaces rotatable on parallel axes, a chain gear to travel between said surfaces, the links of said chain gear being arranged as expansible and contractible gripper jaws normally urged to expanded position and adapted to impinge against the opposed friction surfaces to transmit the motion of one pair of said friction surfaces to the other pair of friction surfaces, and means for the engagement of opposite stretches of said chain to contract the link jaws and guide the same between the friction surfaces.

10. In power transmission mechanism, two pairs of opposed friction disks arranged in alined relation and rotatable on parallel axes, a chain to engage between the disks, a roller mounted at one side and extending longitudinally of each link of the chain and normally urged laterally of the link for impingement against one surface and force the link into impingement with the opposed surface to transmit the rotative movement of one pair of disks to the other pair of disks, oppositely extending pivoted arms arranged for engagement of opposite stretches of the chain and having toothed sectors arranged thereon about the pivotal support of the arms, rack bars for engagement with the toothed sectors to adjust the arms and change the angular position of the chain engaging portions thereof and thereby the position of the chain between the friction surfaces to change the ratio of rotation between the disks, and means for actuating the rack bars.

11. In power transmission mechanism, two pairs of opposed friction surfaces rotatably mounted in spaced relation, a chain gear to travel between said surfaces, the links of said chain gear being arranged with grippers to impinge against the opposed surfaces of each pair of disks to transmit the movement of one pair of said surfaces through the chain gear to the other pair of surfaces, means to engage opposed stretches of said chain gear and guide the same between the disks, means to adjust said guiding means to change the position of the chain gear radially of the disks and thereby change the ratio of revolution of one pair of friction surfaces relative to the other pair of friction surfaces.

12. In power transmission mechanism, two pairs of opposed disks arranged to rotate on parallel axes and in alined relation, a chain passed about and to engage between the disks, each link of said chain being arranged as a pair of jaws expansible and contractable laterally of the direction of travel of the chain to frictionally contact with the opposed surfaces of the disks to operatively connect and transmit the movement of one pair of disks to the other pair of disks, and means supported between the pairs of disks to guide the chain and adjust the links radially of the disks to vary the effective driving radii of the chain whereby the variation in the speed of movement of one pair of said disks to the other pair is accomplished.

13. Power transmission mechanism as claimed in claim 12, wherein the jaws of the chain links are normally urged to expanded position, and carriers and guides to support the chain at opposite stretches arranged to contract the link jaws as they pass from between a pair of disks and guide the links in contracted position between the other disks and releasing said link jaws in the latter position to permit the same to expand and contact with the opposed disks.

14. Power transmission mechanism as claimed in claim 12, wherein the jaws of the links are normally urged to expanded position, and means to support the chain at opposite stretches to receive the chain from a pair of disks and deliver the same between the other pair of disks and arranged to contract the link jaws as the chain comes into engagement therewith and maintain the jaws contracted during the travel thereof along said supporting means, and means to adjust said chain supporting means to variably position the chain radially outward from and toward the axis of the disks.

15. Power transmission mechanism as claimed in claim 12, wherein the jaws of the chain links are normally urged to expanded position and carriers and guides to support the chain at opposite stretches arranged to contract the link jaws as they pass from between a pair of disks and guide the links in contracted position between the other disks and releasing said link jaws in the latter position to permit the same to expand and contact with the opposed disks, said carriers and guides comprising a pair of oppositely extending arms pivotally supported intermediate the two pairs of disks, and a pair of parallel and spaced rails carried by said arms for engagement of the chain links therebetween with the ends terminating between the respective pairs of disks, and said arms being adjustable to variably position the ends of the respective rails toward and away from each other.

16. Power transmission mechanism as claimed in claim 12, wherein the jaws of the links are normally urged to expanded position, a pair of oppositely extending arms pivotally supported intermediate the two pairs of disks, a pair of parallel and spaced rails carried by each arm for engagement and supporting of the chain at opposite stretches and arranged to contract the link jaws and maintain them contracted during the travel thereof along the rails, and means to adjust said arms to variably position the ends of the respective guide rails toward and away from each other and thereby variably position the travel of the chain radially of the disks.

17. Power transmission mechanism as claimed in claim 12, wherein the jaws of the links are normally urged to expanded position, a pair of oppositely extending arms pivotally supported intermediate the two pairs of disks, a pair of parallel and spaced rails carried by each arm for engagement and supporting of the chain at opposite stretches and arranged to contract the link jaws and maintain them contracted during the travel thereof along the rails, and means to adjust said arms to variably position the ends of the respective guide rails toward and away from each other and thereby variably position the travel of the chain radially of the disks, comprising gear teeth arranged on the arms concentric of the pivotal support thereof, slidably supported rack bars meshing with said gear teeth, and means to simultaneously longitudinally adjust said rack bars in opposite directions one relative to the other.

18. Power transmission mechanism as claimed in claim 12, wherein the jaws of the links are normally urged to expanded position, a pair of oppositely extending arms pivotally supported intermediate the two pairs of disks, a pair of parallel and spaced rails carried by each arm for engagement and supporting of the chain at opposite stretches and arranged to contract the link jaws and maintain them contracted during the travel thereof along the rails, gear teeth arranged on the arms concentric of the pivotal support thereof, parallelly arranged slidably supported rack bars meshing with said gear teeth, and means to simultaneously longitudinally adjust said rack bars in opposite directions one relative to the other to variably position the ends of the respective guide rails toward and away from each other and thereby variably position the travel of the chain radially of the disks to change the ratio of revolution of one pair of disks relative to the other pair of disks.

19. Power transmission mechanism as claimed in claim 12, wherein the jaws of the links are normally urged to expanded position, a pair of oppositely extending arms pivotally supported intermediate the two pairs of disks, a pair of parallel and spaced rails carried by each arm for engagement and supporting of the chain at opposite stretches and arranged to contract the link jaws and maintain them contracted during the travel thereof along the rails, and means to adjust said arms to variably position the ends of the respective guide rails toward and away from each other and thereby variably position the travel of the chain radially of the disks, gear teeth arranged on the arms concentric of the pivotal support thereof, parallelly arranged slidably supported rack bars meshing with said gear teeth, a rotatable pinion meshing with teeth on said rack bars, and means to rotate said pinion to simultaneously longitudinally adjust said rack bars in opposite directions one relative to the other and rotate the guide rail carrying arms to position the ends of the respective rails toward and away from each other and thereby variably position the travel of the chain radially of the disks to change the ratio of speed of revolution of one pair of disks relative to the other pair of disks.

Signed at the city of New York in the county of New York and State of New York this 29th day of April, 1926.

ROBERT G. CLARK.